J. HERM.
RAILWAY CROSSING.
APPLICATION FILED OCT. 17, 1916.

1,258,619.

Patented Mar. 5, 1918.

Witness
Fenton H. Belt
J. F. Sherwood

Inventor
Joseph Herm
By Franklin N. Hough
Attorney

UNITED STATES PATENT OFFICE.

JOSEPH HERM, OF LOS ANGELES, CALIFORNIA.

RAILWAY-CROSSING.

1,258,619.  Specification of Letters Patent.  Patented Mar. 5, 1918.

Application filed October 17, 1916. Serial No. 126,228.

*To all whom it may concern:*

Be it known that I, JOSEPH HERM, a citizen of the United States, residing at Los Angeles, in the county of Los Angeles, State of California, have invented new and useful Improvements in Railway-Crossings, of which the following is a specification.

This invention relates to new and useful improvements in crossings for railways and consists in the provision of a safety means whereby it will be necessary to cause mechanism to be actuated to throw rotary grooved disks into alinement with the grooves of the rails before crossings may be effected.

My invention comprises various details of construction, combinations and arrangements of parts which will be hereinafter fully described, shown in the accompanying drawings and then specifically defined in the appended claim.

I illustrate my invention in the accompanying drawings, in which:—

Figure 2:
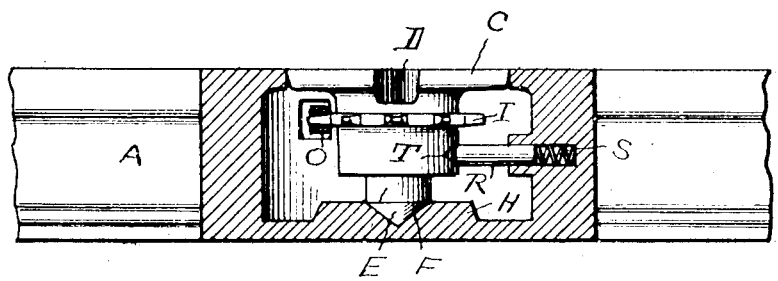
Fig. 2 is a sectional view on line 2—2 of Fig. 1, looking in the direction of the arrows.

Reference now being had to the details of the drawings by letter, A designates a crossing which may be of a single piece or made up of a plurality of rail sections, having grooves B for the reception of flanges. At the intersecting points of the rails are circular outlined openings in which are rotatably mounted the disks C, having shank portions with their lower ends tapering as at E, as shown clearly in Fig. 2 of the drawings, and which have bearing in tapering indentures F formed in the bosses H. Upon the circumference of the shank portion of the rotatable disk is a sprocket wheel I, and T is an indenture formed in the shank portion of the disk and adapted to be engaged by the pointed pin R which is thrown to its outer limit through the medium of the spring S mounted in a hole formed in the wall of the chamber in which the disk is mounted. Said disk has a transverse groove D formed in the outer face and which is of a width equal to the width of the groove B into which it is adapted to be thrown into registration to permit the wheels of a truck to cross.

Figure 1:
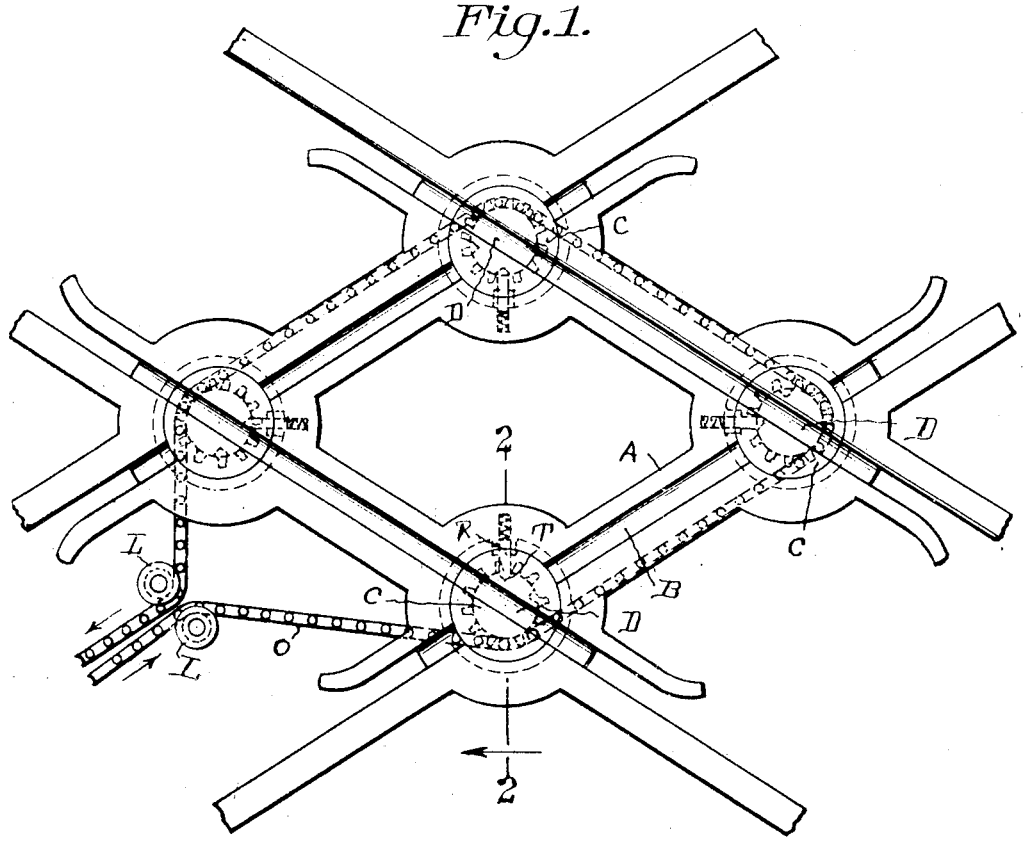
Figure 1 is a top plan view.

A sprocket chain O is mounted about said sprocket wheels I and passes between the idlers L, shown in Fig. 1, which chain may be attached to any suitable means, either manually operated or power controlled whereby the several disks may be thrown in unison to cause the grooves in the disk to register with the flanged grooves in one track or the other.

What I claim to be new is:—

A railway crossing comprising intersecting track sections, having grooves for the flanges of wheels, circular-outlined chambered portions at the intersection of the rails, rotatable disks mounted in each chambered portion and each having a transverse groove adapted to be thrown into registration with the grooves of said rail sections, sprocket wheels rotating with said disks, a sprocket chain passing about the sprocket wheels and adapted to move the same in unison, and a spring-pressed pin for engagement with and adapted to hold the disks in set position.

In witness that I claim the foregoing I have hereunto subscribed my name this 25th day of July, 1916.

JOSEPH HERM.

Witnesses:
CHARLES E. SANCHEZ,
ANTHONY J. TOTH.

Copies of this patent may be obtained for five cents each, by addressing the "Commissioner of Patents, Washington, D. C."